United States Patent [19]

Pratt, Jr.

[11] Patent Number: 4,717,253
[45] Date of Patent: Jan. 5, 1988

[54] OPTICAL STRAIN GAUGE

[75] Inventor: George W. Pratt, Jr., Wayland, Mass.

[73] Assignee: Massachusetts Institute of Technology, Cambridge, Mass.

[21] Appl. No.: 800,676

[22] Filed: Nov. 22, 1985

[51] Int. Cl.$^4$ .............................................. G01B 11/16
[52] U.S. Cl. .......................................... 356/32; 73/800
[58] Field of Search ............... 356/32, 33, 34; 73/795, 73/800

[56] References Cited

U.S. PATENT DOCUMENTS 4,295,738 10/1981 Meltz et al. ............................ 356/32
4,420,251 12/1983 James et al. ............................ 356/32

FOREIGN PATENT DOCUMENTS 2145514 3/1985 United Kingdom ................... 356/32

OTHER PUBLICATIONS

IEEE Publication 79CH 1476-1 AES, Acousto-Optic Sensor Development, Bucaro et al., pp. 572-580.

Primary Examiner—Eugene R. LaRoche
Assistant Examiner—Robert J. Pascal

[57] ABSTRACT

Optical strain gauge employing evanescent field coupling between optical fibers. Optical fibers are spaced apart for evanescent field coupling on a structure whose strain is to be measured. Light is introduced into an input fiber which couples into an output fiber depending on the separation between the fibers. Light coupled into the output fiber is detected to generate an output signal indicative of the separation between fibers and hence strain in the supporting structure. In one embodiment, apparatus is provided to measure strain at a plurality of locations with but a single input and a single output fiber. In this embodiment, the input fiber and the output fiber are separated for evanescent coupling at a plurality of locations. The lengths of the input and output fibers between the locations where strain is measured are unequal to produce light propagation time delays. A light pulse is injected into the input fiber and couples into the output fiber at the successive locations where strain is to be measured. Because of the introduced time delay, the output train of pulses represents strain at the plurality of locations. In another embodiment, the optical fibers are embedded in a composite material such as an epoxy graphite structure. At points of strain measurement, the fibers are brought close together and positioned so that the positioning element transduces strain displacement in the composite into relative motion between the fibers. The positioning element further acts to maintain a gap between the fibers which may contain a suitable optical medium such that evanescent coupling can occur through the medium.

11 Claims, 5 Drawing Figures

OPTICAL STRAIN GAUGE

The Government has rights in this invention pursuant to Contract Number FO8635-83-K-0164 awarded by the Air Force.

BACKGROUND OF THE INVENTION

This invention relates to strain gauges and more particularly to an optical strain gauge utilizing evanescent field coupling between optical fibers.

Light propagating in an input optical fiber will couple into an output fiber at a site where the two fibers are closely spaced through the mechanism known as evanescent field coupling. The optical electromagnetic field outside an optical fiber falls off exponentially from the outer wall of the fiber. Thus, the amount of light energy coupled into the output fiber is a function of the separation between the two fibers at a site where the two fibers are in close proximity.

It is therefore an object of this invention to provide a highly accurate strain gauge based on the principle of evanescent field coupling.

Another object of the invention is such an optical strain gauge which is capable of measuring strain substantially simultaneously at a plurality of locations in an extended mechanical structure such as an airframe or a bridge.

A still further object of the invention is an optical strain gauge employing but a single input and a single output optical fiber to measure strain at a plurality of locations.

SUMMARY OF THE INVENTION

According to the present invention, the strain at selected sites of a structure is measured by mounting on the structure an input optical fiber spaced apart from an output fiber for evanescent field coupling. At the selected sites, the fibers are attached to the structure so that they will experience relative displacement as the structure undergoes a strain at a selected site. Light is injected into the input fiber and couples into the output fiber. A detector is provided to detect light in the output fiber to generate a signal related to the separation between the fibers. In a preferred embodiment, the input fiber and the output fiber are spaced for evanescent coupling at a plurality of locations. The lengths of the two fibers between such locations are unequal to produce time delays in pulses traveling in the two fibers. A pulse of light propagating in the input fiber will serially couple into the output fiber and be detected by a detector. Because of unequal fiber lengths, the output signal will comprise a sequence of pulses, each pulse representing the separation between the fibers at one of the locations where the fibers are closely spaced for evanescent field coupling. Thus, a single input fiber and a single output fiber can be used to measure strain in a structure at a plurality of locations substantially simultaneously.

Strain at a selected site is related to the strength of the signal coupled into the output fiber at that site. This strength will be proportional to the amplitude of the signal in the input fiber at a measurement site. This signal can be calibrated by including coupling sites between the input and output fibers where a fixed, known portion of the input signal is coupled into the output fiber independent of strain. Hence, the output signal would consist of a set of serial pulses some of which are calibration pulses. By coding the delay times between coupling sites the output pulse train can be decoded to establish the identification of a given pulse and the coupling site at which it originated.

BRIEF DESCRIPTION OF THE DRAWING

The invention disclosed herein will be understood better with reference to the drawing of which.

DESCRIPTION OF THE PREFERRED EMBODIMENT

Figure 1:
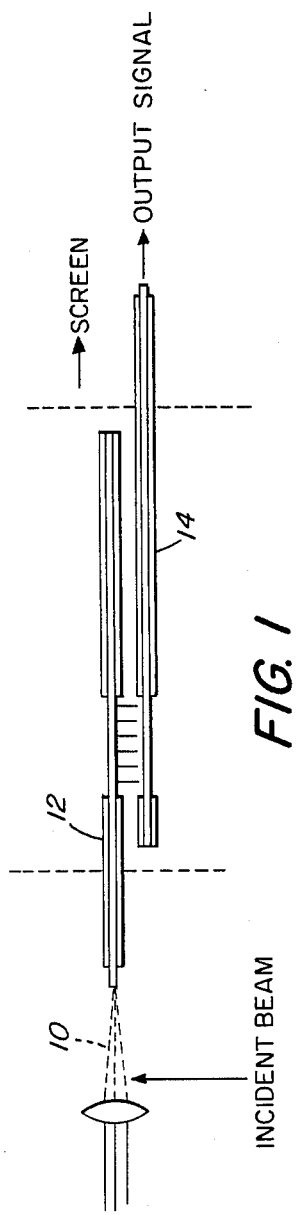
FIG. 1 is a schematic view illustrating the principles of the present invention.

FIG. 1 illustrates the principles of the optical strain gauge disclosed herein. An incident beam of light 10 is introduced into an input fiber 12 which is closely spaced from an output fiber 14. Light propagating in the input fiber 12 will be coupled into the output optical fiber 14 through evanescent field coupling if the two fibers are separated on the order of $10^{-4}$ m. Because the optical electromagnetic field outside the optical fiber 12 falls off exponentially from the outer wall of the fiber, the amount of light coupled into the output fiber 14 is dependent on the separation between the fibers. Therefore, by detecting the light in the output fiber 14, an output signal is generated which is a function of the separation between the fibers. If the input and output fibers are attached to a mechanical element so that the separation between the fibers at the measurement site is determined by a component of strain in the mechanical element at that site, then the light coupled into the output fiber will be dependent on this component of strain.

Figure 2:
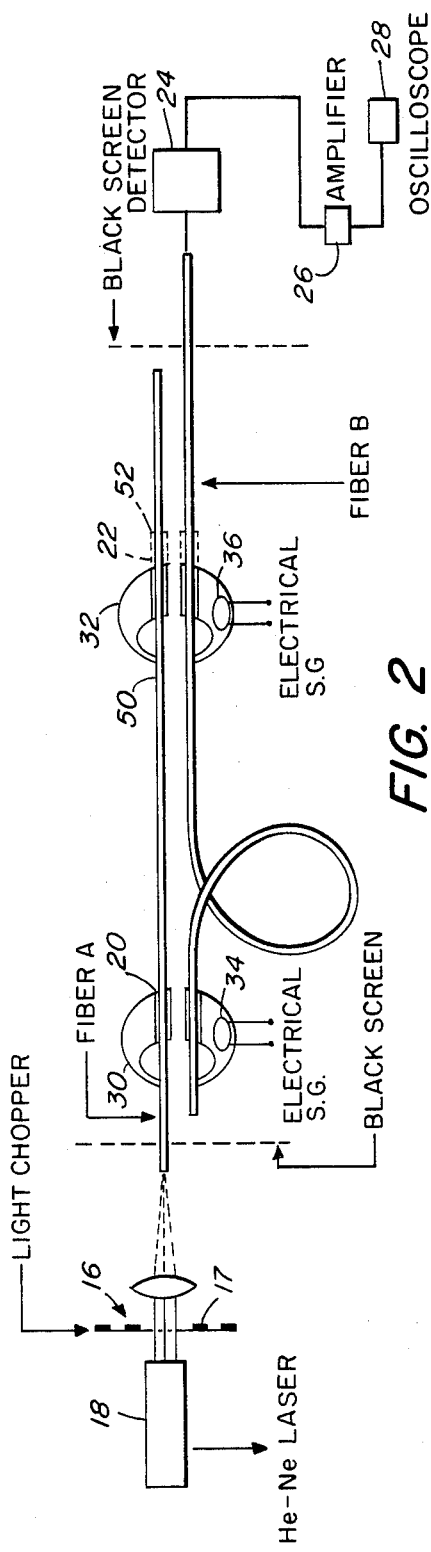
FIG. 2 is a schematic view of an embodiment of the invention for measuring strain at two locations.

FIG. 2 illustrates an embodiment of the present invention utilizing two optical strain gauges in a serial combination. While only two strain gauges are shown in FIG. 2, it should be understood that virtually any desired number of strain gauges can be serially connected. The two strain gauges illustrated in FIG. 2 are therefore entirely exemplary. Apparatus for producing a series of optical pulses 16 shown here as a light chopper 17 chops light from an optical source shown here as a helium neon laser 18 to generate an AC signal of light pulses. The optical source could be a light emitting diode or solid state laser, and the apparatus for producing the pulses 16 could be an electrical pulse generator. This light signal is introduced into the input fiber A. An output fiber B is closely spaced from the input fiber A at the two locations 20 and 22 where strain is to be measured. The output fiber B is looped between the locations 20 and 22 to provide a time delay. Alternatively, the loops could be provided in the input fiber. With such an arrangement, a single pulse traveling in fiber A will first couple into fiber B at the location 20 and will propagate in fiber B toward a light detector 24. The output of the light detector 24 is amplified in an amplifier 26 and observed on an oscilloscope 28. The pulse in fiber A continues to propagate beyond the location 20 and will next couple into fiber B at the location 22. Because of the time delay produced by the loop in fiber B, the signals coupled into the fiber B at the locations 20 and 22 will reach the detector 24 at different times allowing each of the signals to be processed separately. In this way, strain can be measured at a plurality of locations using only a single input and a single output optical fiber. In the embodiment in FIG. 2, a single pulse traveling along fiber A will thus produce an output signal comprising two pulses indicative of the strain at the locations 20 and 22. In order that the time delays produce distinguishable signals at the detector, the temporal pulse width entering the input fiber must be less than the shortest time delay between any two measurement sites. Assuming an index of refraction of 1.5 for the optical fiber, propagation time between sites one meter apart would be $6.7 \times 10^{-9}$ seconds. Therefore, pulse widths of $10^{-9}$ seconds combined with site separations plus intersite delays corresponding to $10^{-8}$ second delays between sites would produce well resolved output pulses from each measurement site.

Figure 3:
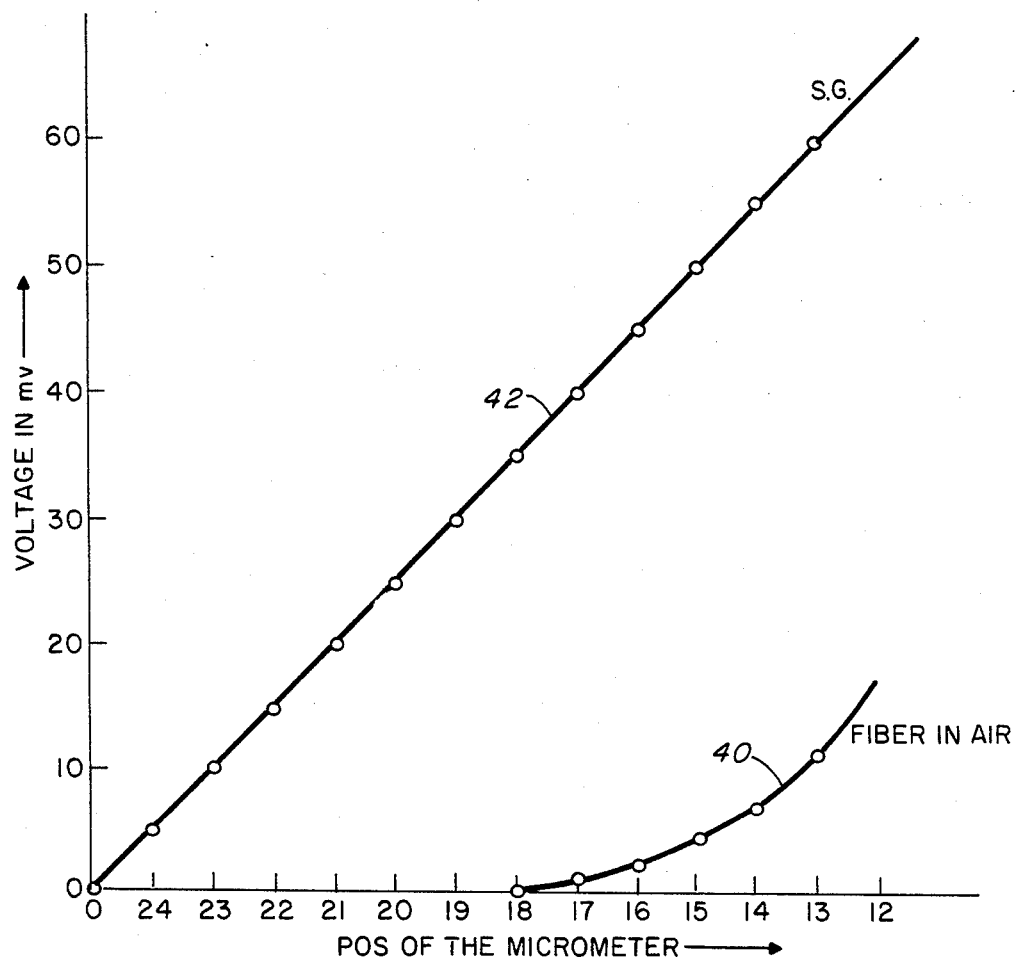
FIG. 3 is a graph comparing the output of the optical strain gauge disclosed herein with an electrical strain gauge.
Figure 4:
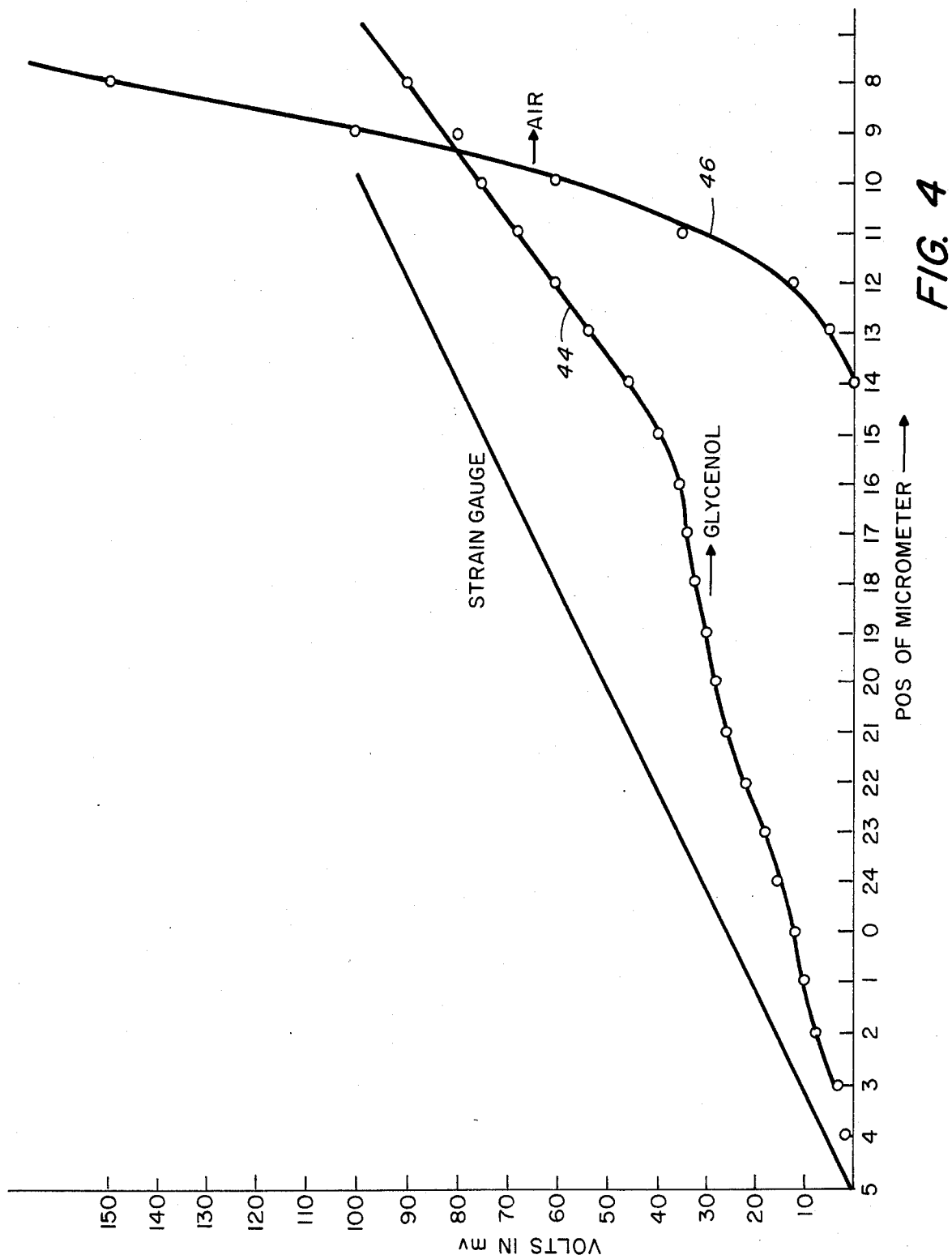
FIG. 4 is a graph comparing the output of optical strain gauges having the optical fibers separated by air and by glycerol.

The strain gauge illustrated in FIG. 2 has been built at the Massachusetts Institute of Technology and successfully tested. The strain gauge system was tested by mounting the input and output fibers on slotted flexible rings 30 and 32. Force producing apparatus (not shown) was provided to alter the separation between the fibers in the slotted rings 30 and 32. The rings 30 and 32 were also outfitted with electrical strain gauges 34 and 36 to make an independent measurement of the separation between the fibers. In FIG. 3, a curve 40 is a plot of the output signal from the detector 24 as a function of spacing between the fibers. A curve 42 is the output of the electrical strain gauge 34. The curve 40 was obtained with air filling the space between fibers. Note that the curve 40 is substantially exponential which was expected since the optical electromagnetic field beyond the outer wall of the fiber falls off exponentially. The sensitivity of the optical strain gauge disclosed herein is about eight times that of the electrical strain gauge. Furthermore, it has been found that the useful separation range between fibers can be increased by using an index of refraction matching fluid in the gap between the fibers. FIG. 4 shows the results obtained when glycerol 50 is maintained by a structure 52 between the fibers at the location 22 in FIG. 2. In FIG. 4, a curve 44 illustrates the output of the detector 24 when glycerol fills the gap between the fibers. Note that the useful separation range is greater than for an air-filled gap as shown in a curve 46. Although a linear dependence of output signal with strain is desirable, an exponential dependence is easily dealt with by using computer techniques (not shown) to interpret the output signal. Furthermore, including calibration couplers between input and output fibers at one or more sites enhances the accuracy of data interpretation.

In the embodiment of FIG. 2, the exemplary detector 24 is a diode photo-detector. The optical fibers in FIG. 2 have a diameter of 0.05 mm including the cladding; the diameter of the fiber only was 0.025 mm. The length of the loop in output fiber B between the locations 20 and 22 was approximately 10 m which introduces a time delay sufficient to allow pulses $10^{-9}$ second in duration from the locations 20 and 22 to be analyzed separately.

Since any desired number of optical coupling sites, i.e., strain gauges may be provided, an array of optical strain gauges can be placed at different points on a large structure with coded delays being introduced between signals coming from the various strain gauge locations. A single input pulse introduced into the input fiber A produces a train of output pulses in the output fiber B, one pulse for each strain sensor. The temporal separation of successive pulses in this sequence is controlled by the built-in time delays between the sensors. Thus, by analyzing the output fiber signal, it is possible to determine from which locations the individual signals originate, and their amplitude would depend on the strain at the sensor site.

Figure 5:
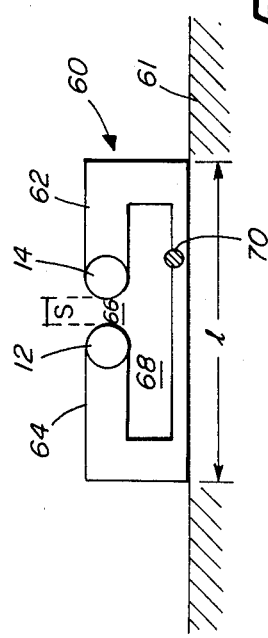
FIG. 5 is a schematic view of an embodiment of the invention utilizing mounting clips to support the optical fibers.

Another embodiment of the invention will now be described in conjunction with FIG. 5. In this figure, a structure is shown that transduces strain at a measurement site to a change of separation of two closely spaced fibers running perpendicular to the plane of the figure. In particular, the optical fibers 12 and 14 are mounted on a clip member 60 which is cemented or otherwise firmly attached to a structure 61 in which strain is to be measured. The input fiber 12 and output fiber 14 are attached by adhesive to arms 62 and 64 of the clip 60 which extend toward one another leaving a gap 66. The length of the clip 60 is 1 and the gap spacing is s. Strain $\epsilon$ in the underlying structure 61 creates a change $\Delta 1$ in the length of the clip 60. That is, $\epsilon = \Delta 1 / 1$. The change in the width of the gap 66 is equal to $\Delta 1$. If, for example, the gap s is chosen to be 20 microns, then $\Delta s = \Delta 1 = 1\epsilon$. If 1 is selected to be 1 cm then a 0.1% strain would produce a $\Delta s$ of $10^{-3}$ cm or 10 microns.

The construction of the clip 60 concentrates the entire strain displacement $\Delta 1$ or equivalently $\Delta s$ in the gap between the fibers. In order to use an index matching fluid in the gap 66, provision must be made to confine the fluid in the gap and prevent leakage. This confinement is not shown in FIG. 5. Mechanical vibration of the arms 62 and 64 can be minimized by a damping substance 68 such as RTV placed in the interior of the clip. It is to be noted that this clip arrangement measures strain only in the direction perpendicular to the axis of the fibers 12 and 14. By doubling the input and output fibers back to the same site with their orientation being defined by a second clip structure fixed in a different direction from the first clip, it would be possible to measure strain in a plurality of directions at a measurement site. It should also be noted that the expansion and contraction of the substrate due to temperature changes would also produce changes in the gap 66 and hence in the optical output. It is readily apparent that temperature measurements can be made at each measurement site to compensate for temperature induced changes in the optical signal. In FIG. 5, a temperature transducer 70 is incorporated within the clip 60 and transmits temperature information in the conventional manner such as by electrical leads (not shown). Thus, temperature information can be combined with the optical information to produce a temperature compensated strain measurement output.

It is thus seen that the objects of this invention have been achieved in that there has been disclosed optical strain gauge apparatus capable of measuring strain substantially simultaneously at multiple locations with but a single input and a single output fiber. The range of the separation between fibers which results in useful output signals can be extended by using an index matching fluid such as glycerol in the gap between the fibers.

It is recognized that modifications and variations of the present invention will occur to those skilled in the art and it is intended that all such modifications and variations be included within the scope of the appended claims.

What is claimed is:

1. Apparatus for measuring strain in a structure at a plurality of locations substantially simultaneously comprising:
   an input fiber and an output fiber spaced from one another at the plurality of locations for evanescent field coupling at these locations, the length of the input fiber being different from that of the output fiber between the locations to introduce time delays;
   means for injecting light pulses into the input fiber and means for detecting light pulses in the output fiber to generate an output signal related to the separation of the input and output fibers at the plurality of locations of evanescent field coupling.

2. The apparatus of claim 1 wherein the space between fibers at the plurality of locations is filled with air.

3. The apparatus of claim 1 wherein the space between fibers at the plurality of locations is filled with an index matching fluid.

4. The apparatus of claim 3 wherein said index matching fluid is glycerol.

5. The apparatus of claim 1 further including temperature transducers mounted on the structure at the plurality of locations to provide a temperature signal to compensate the strain measurements.

6. The apparatus of claim 1 further including coupling sites between the input and output fibers, the coupling sites adapted to couple a fixed, known portion of the input signal into the output fiber independent of strain.

7. The apparatus of claim 1 wherein the input and output fibers at the plurality of locations are mounted in clip structures adapted to maintain the fibers separated by a predetermined amount for evanescent field coupling.

8. The apparatus of claim 7 wherein the clip structure includes a base portion adapted for attachment to the structure whose strain is to be measured, and arms depending from the base structure for supporting the optical fibers, the space between the arms and the base portion being filled with a material to provide mechanical vibration damping.

9. The apparatus of claim 8 further including a temperature transducer mounted on the clip for measuring the temperature of the clip.

10. The apparatus of claim 8 wherein each of the plurality of locations includes two of the clip structures oriented in different directions.

11. Apparatus for measuring strain of a structure comprising:
   an input and an output optical fiber mounted on the structure and spaced for evanescent field coupling therebetween;
   means for introducing light into the input fiber and means for detecting light propagating in the output fiber to generate an output signal, the output signal being a function of the separation between the input and the output fiber indicative of the strain of the structure and further including a temperature transducer mounted on the structure for temperature compensation of the strain measurement.

* * * * *